United States Patent [19]
Annabel et al.

[11] Patent Number: 6,102,319
[45] Date of Patent: Aug. 15, 2000

[54] DEVICE FOR REMOVING FISHING LINE FROM FISHING REELS

[76] Inventors: Jeffrey C. Annabel; Beverly Annabel, both of 327 SW. 1st Ave., Boynton Beach, Fla. 33435

[21] Appl. No.: 09/055,643

[22] Filed: Apr. 6, 1998

[51] Int. Cl.⁷ .............................. B21C 47/02; B65H 75/28
[52] U.S. Cl. .................. 242/362; 242/125.1; 242/608.4; 242/613.1
[58] Field of Search .............................. 242/608.4, 608.5, 242/608.6, 609.2, 609.3, 610.6, 613.2, 613.4, 613.1, 125.1, 597.4, 597.6, 362, 118.5

[56] References Cited

U.S. PATENT DOCUMENTS

| | | | |
|---|---|---|---|
| 1,591,771 | 7/1926 | Batchelor | 242/118.5 X |
| 1,822,422 | 9/1931 | Richardson | 242/613.1 X |
| 2,518,533 | 8/1950 | Edwards | 242/597.4 |
| 3,717,315 | 2/1973 | Kovaleski | 242/125.1 X |
| 3,973,741 | 8/1976 | Dean | 242/404.2 |
| 4,168,042 | 9/1979 | Joe et al. | 242/613.1 X |
| 4,196,864 | 4/1980 | Cole | 242/608.5 |
| 4,951,890 | 8/1990 | Sossamon | 242/486.8 |
| 5,381,981 | 1/1995 | Nelson | 242/613.1 X |

*Primary Examiner*—Michael R. Mansen
*Attorney, Agent, or Firm*—Robert M. Downey, P.A.

[57] ABSTRACT

A fishing line removal device and method is shown with two frustoconical spool portions, each having a larger diameter end and a smaller diameter end, and being arranged on a rod with the smaller diameter ends of the two spool portions contacting each other. A free end of a fishing line is trapped between the smaller diameter ends of the two frustoconical spool portions, and the spool portions are then locked in position on the rod. When the rod is rotated as a unit with the two frustoconical spool portions and the free end of the fishing line trapped between the smaller diameter ends of the two spool portions, a neat, compact and donut-shaped bundle of fishing line is formed around the tapered outer peripheral surfaces of the two frustoconical spool portions. Removal of one of the spool portions from the rod allows removal of the donut-shaped bundle of fishing line for reuse or recycling.

5 Claims, 1 Drawing Sheet

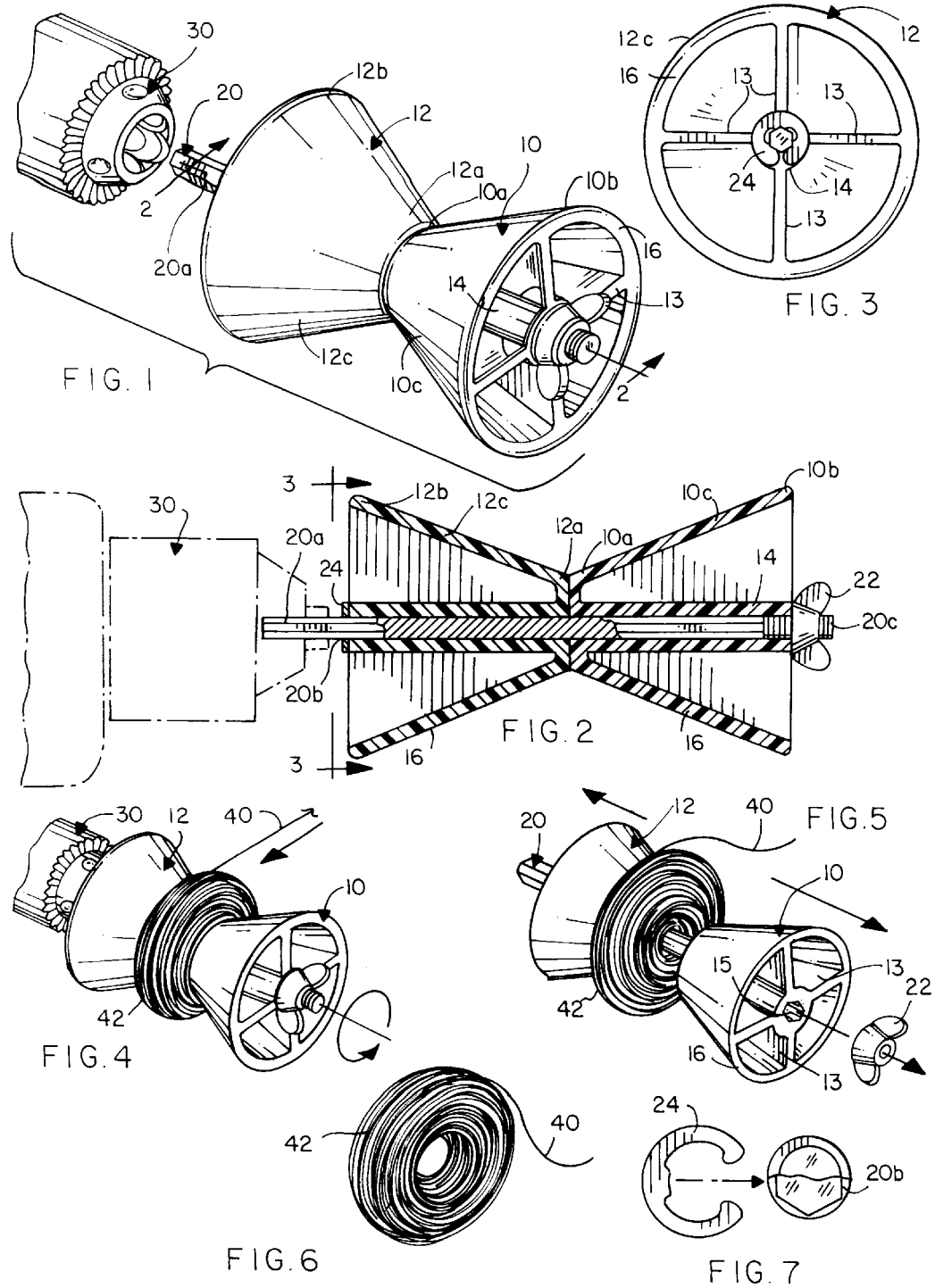

DEVICE FOR REMOVING FISHING LINE FROM FISHING REELS

BACKGROUND OF THE INVENTION

1. Field of the Invention

The present invention relates to a device and method for removing fishing line from fishing reels and storing the fishing line in a compact, neat bundle that allows for safe disposal of the fishing line or easy reuse of the fishing line.

2. Discussion of the Related Art

A problem is faced by fishermen when the fishing line that they are using eventually becomes fatigued, damaged, or otherwise undesirable for continued use. Such a problem is encountered as a result of having caught a number of fish using a particular length of fishing line, or the fishing line having been damaged as a result of rubbing on rocks, sea walls, or other obstacles. Continued use of a length of fishing line also results in the fishing line becoming fatigued, stretched, and otherwise rendered incapable of withstanding a desired load. The loss of utility of a particular length of fishing line, or even just the desire to change the fishing line with a different type of fishing line, creates a need for a device and method for quickly and efficiently removing fishing line from a fishing reel and storing the fishing line into a neat and compact bundle that will allow for economical and safe disposal of the fishing line or storing of the fishing line for later reuse.

Known methods for removing fishing line from fishing reels are both time-consuming and labor intensive, and often result in an entangled mess of fishing line that cannot be reused and if disposed of, presents an environmental hazard since fish or other animals can become entangled in the fishing line and often killed.

SUMMARY OF THE INVENTION

In view of the above problems encountered in the fishing industry, an object of the present invention is to provide a device and method for safely and efficiently removing fishing line from fishing reels and arranging the fishing line into neat and compact bundles that allow for recycling of the fishing line for efficient and safe disposal.

An embodiment of the present invention includes at least two frustoconical spool portions, with each spool portion having a larger diameter end, a smaller diameter end, and a tapered outer peripheral surface extending from the larger diameter end to the smaller diameter end. Two of the frustoconical spool portions are arranged so that their smaller diameter ends abutting each other and with the spool portions supported on a rod or other means for supporting and rotating the spool portions about their central axes. The spool portions can be easily assembled onto and disassembled from the rod or other means, and when assembled on the rod or other means, can be locked in position with the smaller diameter end portions abutting each other such that the spool portions and the rod or other means can be rotated as a single unit.

According to the present invention, an end of fishing line desired to be removed from a fishing reel can be trapped between the two spool portions as they are assembled on the rod or other means and subsequent rotation of the spool portions results in the fishing line being wrapped around the tapered outer peripheral surfaces of the adjacent spool portions in order to form a donut-shaped bundle, which can then be easily removed upon disassembly of the spool portions.

Other features and advantages of the present invention will be well appreciated upon reading of the following description of the invention when taken in conjunction with the attached drawings and with the understanding that some modifications, variations and changes could be made by a skilled person in the art to which the invention pertains without departing from the spirit of the invention or the scope of the claims appended hereto.

BRIEF DESCRIPTION OF THE DRAWINGS

The present invention can be more fully understood by reference to the following description and accompanying drawings, which form an integral part of this application:

FIG. 1 is a perspective view of a preferred embodiment of the present invention showing frustoconical spool portions assembled on a rod and a portion of a device for rotating the rod and spool portions;

FIG. 2 is a fragmentary sectional view taken generally along lines 2—2 in FIG. 1;

FIG. 3 is an end elevation view taken in the direction of arrows 3—3 in FIG. 2;

FIG. 4 is a perspective view showing fishing line being wrapped onto an assembly of two frustoconical spool portions according to an embodiment of the present invention;

FIG. 5 is an exploded perspective view showing disassembly of two spool portions after formation of a bundle of fishing line according to the present invention;

FIG. 6 is a perspective view of a completed bundle of fishing line produced by the present invention; and FIG. 7 is an end elevation view in partial cross section showing a snap ring used in an embodiment of the present invention for positioning the frustoconical spool portions on a rod.

DETAILED DESCRIPTION OF THE PREFERRED EMBODIMENTS

Referring to FIG. 1, an embodiment of the present invention is shown having a first spool portion 10 and a second spool portion 12 assembled in abutting relationship with a small diameter end 10a of spool portion 10 contacting a small diameter end 12a of spool portion 12. Spool portions 10 and 12 can be molded from plastic or nylon according to techniques known in the molding art such that a tapered outer peripheral surface 10c extends from smaller diameter end 10a to larger diameter end 10b of spool portion 10, and a tapered outer peripheral surface 12c extends from smaller diameter end 12a to larger diameter end 12b of spool portion 12. As an example, the embodiment shown in FIG. 1 includes spool portion 10 having longitudinal molded ribs 13 extending radially inward from the outer peripheral frustoconical wall 16 to a central axial boss 14 through which a central axial bore 15 is defined. Spool portions 10 and 12 are assembled on a shaft 20 extending through the central axial bores of each spool portion and are locked in position on shaft 20 between a stop portion 20b and a retaining portion 20c of the shaft 20. The central axial bore 15 of each spool portion is hexagonal in cross section and mates with a portion of the shaft 20 that is also hexagonal in cross section, thereby preventing rotation of the spool portions 10 and 12 relative to the shaft 20. A snap ring 24 can be placed around shaft 20 and engaged in a groove defined in the outer peripheral surface of shaft 20 at stop portion 20b in order to contact the large diameter end 12b of spool portion 12. The small diameter end 10a of spool portion 10 contacts small diameter end 12a of spool portion 12 and a wing nut 22 is threaded onto retaining portion 20c of shaft 20, wherein tightening of wing nut 22 urges the spool portion 10 inwardly towards spool portion 12, thus locking the spool portions 10 and 12 in mating relation on shaft 20 in an assembled condition.

A gripping portion 20a of shaft 20 at an opposite end from the retaining portion 20c provides a surface that can be gripped by a rotary device 30 in order to rotate shaft 20 and assembled spool portions 10 and 12 as a single unit.

Although in the preferred embodiment, as shown in FIGS. 1 and 2, a snap ring 24 engaged with a groove at stop portion 20b of shaft 20 is used to stop the spool portions in position on the shaft, alternative embodiments could include simply forming shaft 20 with a shoulder acting as stop portion 20b. Additionally, alternative means for retaining spool portions 10 and 12 on shaft 20 could be devised rather than using a wing nut 22 as shown in the preferred embodiment.

A method of using the present invention includes assembling spool portion 12 onto shaft 20 with large diameter end 12b of spool portion 12 contacting snap ring 24 at stop portion 20b of shaft 20. Subsequently, spool portion 10 is placed on shaft 20 with small diameter end 10a of spool portion 10 adjacent small diameter end 12a of spool portion 12. A free end of fishing line 40 can then be placed between small diameter ends 12a and 10a of spool portions 12 and 10, and trapped in position by tightening wing nut 22 over retaining end 20c of shaft 20 to apply pressure to large diameter end 10b of spool portion 10, thereby locking the spool portions together as a unit with shaft 20. Shaft 20 can then be gripped at gripping portion 20a by a rotating device 30 and rotated together with spool portions 10 and 12 as a unit. As the assembled spool portions rotate about their central axes on rod 20, fishing line 40 wraps around the tapered outer peripheral surfaces 10c and 12c of spool portions 10 and 12 in order to form a donut-shaped bundle.

After the desired amount of fishing line is removed, spool portion 10 is removed from shaft 20, as shown in FIG. 5, by removal of wing nut 22 from the retaining portion 20c of shaft 20. A neat and compact bundle 42 of fishing line 40, as shown in FIG. 6, can then be slid off of shaft 20 away from the tapered outer peripheral surface of spool portion 12. The bundle 42 of fishing line 40 can then be either reused or disposed of and/or recycled in an environment friendly fashion.

While the invention has been described in terms of what is presently considered to be the most practical and preferred embodiments, it is to be understood that the invention does not need to be limited to the disclosed embodiments. There is modifications and similar arrangements included within the spirit and scope of the appended claims which are contemplated by the inventors.

What is claimed is:

1. A method for removing fishing line from a reel and arranging the fishing line in a neat, reusable bundle using a pair of frustoconical spool portions, each spool portion having a larger diameter end, a smaller diameter end, and a tapered outer peripheral surface extending from the larger diameter end to the smaller diameter end, and said spool portions being supported by a drive means for rotation about the central axes with their smaller diameter ends in abutting relationship, said method comprising the steps of:

placing a first one of said spool portions on the drive means, positioning a free end of said fishing line against the smaller diameter end of said first spool portion, placing a second one of said spool portions on the drive means with the smaller diameter end of the second spool portion abutting the smaller diameter end of the first spool portion and trapping the free end of the fishing line between the spool portions, rotating the spool portions about their central axes with the drive means to wrap the fishing line into a donut-shaped bundle about the tapered outer peripheral surfaces of said spool portions, and removing said second spool portion from said drive means so that said donut-shaped bundle can be slid off of said spool portions and said drive means.

2. The method as recited in claim 1 wherein said step of placing said first one of said spool portions on the drive means further comprises the steps of:

providing a stop portion on the drive means; and placing the first spool portion on the drive means with the larger diameter end stopped against the stop portion on the drive means.

3. The method as recited in claim 2 wherein said step of providing a stop portion on the drive means further comprises the step of:

engaging a snap ring around an outer peripheral surface of said drive means.

4. The method as recited in claim 2 wherein said step of placing a second one of said spool portions on the drive means comprises the further steps of:

providing retaining means on the drive means;

placing the second spool portion on the drive means with the smaller diameter end of the second spool portion abutting the smaller diameter end of the first spool portion; and retaining the second spool portion on the drive means, in abutting engagement with the first spool portion by tightening the retaining means against the larger diameter end of the second spool portion.

5. The method as recited in claim 4 wherein said step of providing retaining means further comprises the step of:

providing a wing nut for threaded engagement on the drive means.

* * * * *